United States Patent [19]

Kastendieck et al.

[11] Patent Number: 4,755,725

[45] Date of Patent: Jul. 5, 1988

[54] HIGH INTENSITY LIGHT SHUT-DOWN CIRCUIT FOR NIGHT VISION GOGGLE

[75] Inventors: William A. Kastendieck, Wylie; Darrell E. Lee, Richardson, both of Tex.

[73] Assignee: Varo, Inc., Garland, Tex.

[21] Appl. No.: 944,012

[22] Filed: Feb. 27, 1987

Related U.S. Application Data

[63] Continuation-in-part of Ser. No. 808,120, Dec. 12, 1985, Pat. No. 4,672,194.

[51] Int. Cl.$^4$ ............................................. H01J 31/50
[52] U.S. Cl. ...................................... 315/360; 315/159; 315/149; 250/213 VT; 250/207; 250/213 A; 307/311; 307/597; 307/157
[58] Field of Search ............... 250/205, 552, 206, 207, 250/213 R, 213 A, 213 VT, 214 R, 214 AL, 214 SW, 215; 315/149, 158, 159, 360, 241 R, 241 P; 307/311, 157, 592, 597

[56] References Cited

U.S. PATENT DOCUMENTS

| | | | |
|---|---|---|---|
| 3,781,560 | 12/1973 | DeBurgh et al. | 250/213 VT X |
| 3,787,688 | 1/1974 | Stone | 250/213 VT |
| 3,890,538 | 6/1975 | Iwata et al. | 315/241 P |
| 3,944,817 | 3/1976 | Hilsum et al. | 250/213 VT |
| 4,037,921 | 7/1977 | Cox | 250/213 R |
| 4,091,398 | 5/1978 | Iida et al. | 315/241 P |
| 4,117,376 | 9/1978 | Andrews | 315/200 R |
| 4,158,155 | 6/1979 | Hauenstein | 315/151 |
| 4,382,180 | 5/1983 | Woolgar | 250/213 VT |
| 4,463,252 | 7/1984 | Brennan et al. | 250/213 VT |
| 4,510,419 | 4/1985 | Takematsu | 315/241 P |
| 4,593,234 | 6/1986 | Yang | 315/360 X |
| 4,629,881 | 12/1986 | Fairbend et al. | 250/213 VT |
| 4,672,194 | 6/1987 | Kastendieck et al. | 250/213 VT |

Primary Examiner—David K. Moore
Assistant Examiner—Mark R. Powell
Attorney, Agent, or Firm—Jerry W. Mills; Roger N. Chauza

[57] ABSTRACT

A circuit for automatically removing battery power from a night vision goggle (10) upon its detachment from a headgear (12) or when subjected to excessive light. A magnet (34) on the headgear (12) is magnetically coupled to a magnetic reed switch (36) fixed to the goggle (10). On detachment of the goggle (10) from the headgear (12), the reed switch (36) switches battery current to a goggle location monitor (75) for drilling on/off control logic (79) to remove power from an image intensifier tube (40). A high intensity light monitor (80) senses when the ambient light exceeds a predefined intensity, for a predetermined period of time, and also drives the control logic (79) to open a switch (86) in series with the battery (38) and the image intensifier tube (40). A low voltage monitor (82) provides a visual indication (84) of reduced battery voltages.

22 Claims, 3 Drawing Sheets

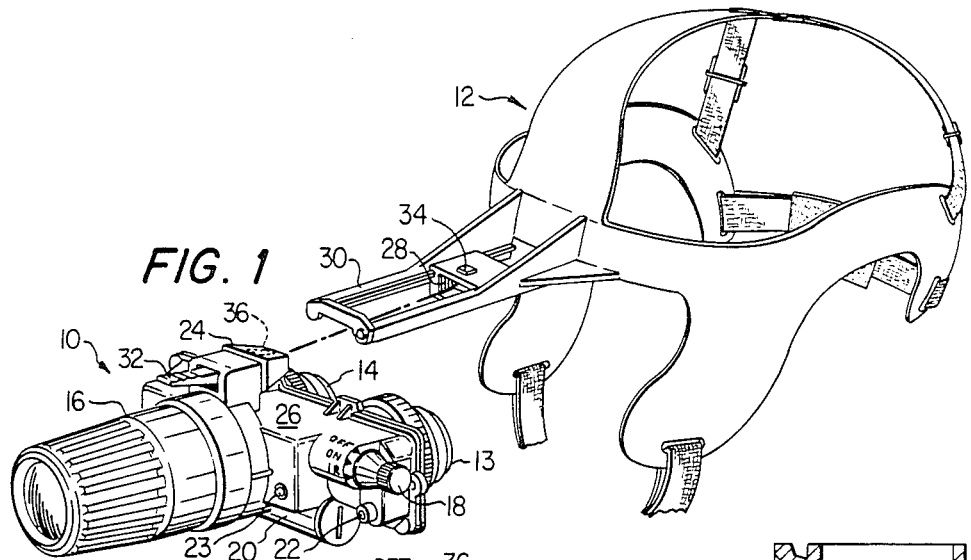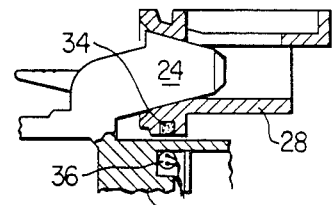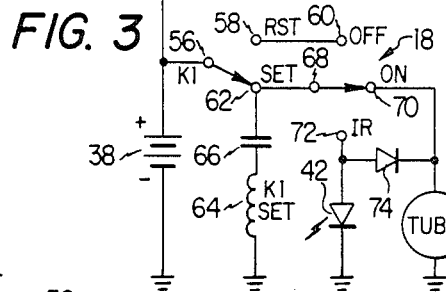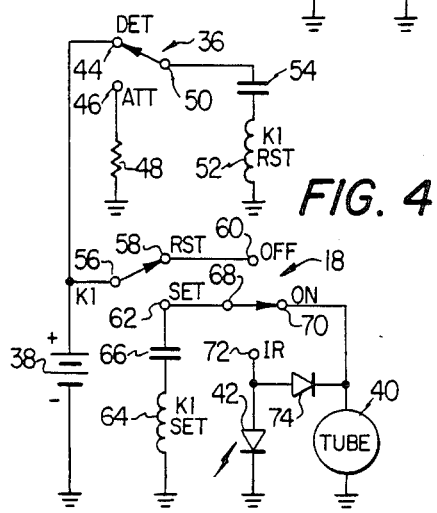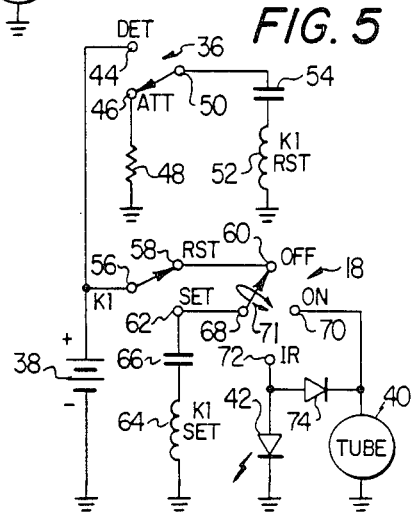

HIGH INTENSITY LIGHT SHUT-DOWN CIRCUIT FOR NIGHT VISION GOGGLE

This application is a continuation-in-part of copending U.S. application entitled "Passive Proximity Battery Control Circuit For Night Vision Goggles", by William A. Kastendieck and Thomas E. Broyles, Ser. No. 808,120, filed Dec. 12, 1985 now U.S. Pat. No. 4,672,194.

RELATED APPLICATIONS

"Night Vision Goggle Headgear", by William A. Kastendieck and Richard T. Hart, U.S. Pat. No. 4,703,879, issued Nov. 3, 1987;

"Adjustable Night Vision Goggle Mounting Bracket", by Richard T. Hart, U.S. Pat. No. 4,670,912, issued June 9, 1987;

"Quick Release Bracket For Night Vision Goggles", by William A. Kastendieck, Richard T. Hart and Wayne Isbell, U.S. Pat. No. 4,697,783, issued Oct. 6, 1987, all assigned to the present assignee.

"Turning Mirror for Integrating Image and Light Indicator Ray Bundles", by William A. Kastendieck, Paul B. Mattes and Steve D. Puckett, Ser. No. 872,274, filed June 9, 1986.

TECHNICAL FIELD OF THE INVENTION

The present invention relates in general to night vision goggles, and more particularly relates to battery control circuits associated therewith.

BACKGROUND OF THE INVENTION

While night vision goggles may find commercial applications in civilian use, the primary use of such goggles is with the military. Night vision goggles enable a person to see objects in the darkness, which objects could not otherwise be seen by the naked eye. The principle by which night vision goggles operate is that there is generally some source of external light, such as the stars or moon, which are capable of illuminating objects. While the naked eye may not be able to detect such illuminations reflected from an object, the reflections can be electrically amplified so as to be visible to the observer's eye.

Therefore, the principle by which night vision goggles can make objects viewable in darkness is the electrical amplification of reflected light. An image of the object is displayed on a phosphorescent screen within the goggle. A battery powered photomultiplier or image intensifier tube is conventionally used to electrically amplify the light signals for presentation on the green phosphor coated screen. The image is monochromatic, with the intensity of the phosphor representative of the amount of light reflected from the object. The phosphor coated screen is very sensitive and subject to accelerated degradation when exposed to high intensity light. Excessively lighted objects may thus overload the image tube and wash out the display on the phosphor screen.

An on-off switch is typically mounted on the night vision goggle to switch battery power to the image intensifier tube during use, and for removing battery power from the tube either during nonuse to conserve battery power, or during lighted conditions to extend the life of the image intensifier tube. Because night vision goggles may be worn for extended periods of time, headgear is also provided for detachably mounting the goggles thereto, thereby allowing the wearer the free use of both hands. Night vision goggles are commonly detachably mounted to the headgear so as to be quickly removed should an emergency situation arise.

While the foregoing arrangement can greatly facilitate the nocturnal activity of a soldier, there are several inherent shortcomings. For example, if the battery is not switched off after the night vision goggles are removed from the headgear, the battery life can be substantially shortened. Other than roughly guessing at the number of hours of battery use, the soldier has no indication that the battery is nearly discharged. More importantly, if the night vision goggle is removed from the headgear, the green phosphorescent glow emanating from the exposed rear of the goggle can be quickly and easily spotted by others who are also wearing night vision goggles, thereby exposing the wearer to danger. Both the life of the battery and that of the image intensifier tube can be shortened if the goggle power is inadvertently left on during periods of normal lighting.

From the foregoing, it may be seen that a need has arisen for a mechanism which automatically removes the battery power from the night vision goggle when detached from the headgear, or when subjected to periods of normal lighting. Because such automatic power removal mechanism itself utilizes battery power, it is important that the power drain is extremely low. It is also important that the subsequent reengagement of the goggle to the headgear does not automatically reapply power to the goggle without an intentional act to do so by the user. This is useful in field operations where a reengagement of the goggle to the headgear for storage purposes would power up the goggle and cause an unnecessary drain on the battery. There is an associated need to provide a visual indication of the imminent discharged state of the battery.

SUMMARY OF THE INVENTION

In accordance with the present invention, an electrical circuit for night vision goggles is provided which substantially reduces or eliminates the shortcomings previously associated with prior night vision goggles. In accordance with the present invention, a battery control circuit is responsive to the detachment of the night vision goggle from the headgear to disconnect the battery. The battery control circuit is responsive to a manual switch to reconnect the battery to appropriate circuits. In order to detect detachment of the night vision goggle, a magnet is fixed to the headgear, and a magnetic reed switch is attached to the night vision goggle. The magnet and magnetic reed switch are magnetically coupled when the night vision goggle is attached to the headgear.

A battery On-Off switch is provided on the night vision goggle, and is manually activated to control the application of battery power to the photomultiplier tube. A low power bistable logic circuit is responsive to the removal of the goggle from the headgear by opening of the reed switch, to thereby disconnect the battery from the image intensifier tube of the night vision goggle. The bistable logic circuit is placed in the other state when goggle is reattached and the reed switch closes, and the manual switch is cycled from the Off position to the On position.

A light intensity monitor is provided for sensing the brightness of light to which the image intensifier tube is subjected. When the light intensity reaches a preset threshold value, such as when in a lighted room, a timer is activated. If the light intensity exceeds the threshold for more than a minute, for example, the timer is operative to open a switch to automatically remove power from the image intensifier tube, as well as from other circuitry.

The switch is driven by control logic circuits in response to the light intensity monitor, and comprises a field effect transistor (FET) placed in series with the battery and the tube. To provide an extremely low series resistance, the FET is driven by a voltage which is larger than the battery voltage. A voltage multiplier is employed to boost the battery voltage to drive the FET switch.

A battery monitor circuit senses when the battery voltage falls below a predetermined voltage. The monitor circuit provides a blinking visual indication to the goggle user of the imminent battery failure.

BRIEF DESCRIPTION OF THE DRAWINGS

Further features and advantages of the present invention will become apparent from the description of an illustrative embodiment thereof, taken in conjunction with the accompanying drawing, in which:

FIG. 1 is an isometric view of the mounting apparatus of the night vision goggle headgear, showing the detachment sensing means;

FIG. 2 is a partial cross-sectional view of the goggle stud and receptacle, showing the relative positions of the proximity sensing means;

FIG. 3 is an electrical schematic drawing of the battery control circuit switchably connected for normal use;

FIG. 4 is the electrical schematic drawing of the battery control circuit of FIG. 3 after detachment of the goggle from the headgear;

FIG. 5 is the electrical schematic drawing of the battery control circuit of FIG. 3 illustrating the cycling of the On-Off switch to reconnect the battery to the tube;

DETAILED DESCRIPTION OF THE INVENTION

Figure 6:
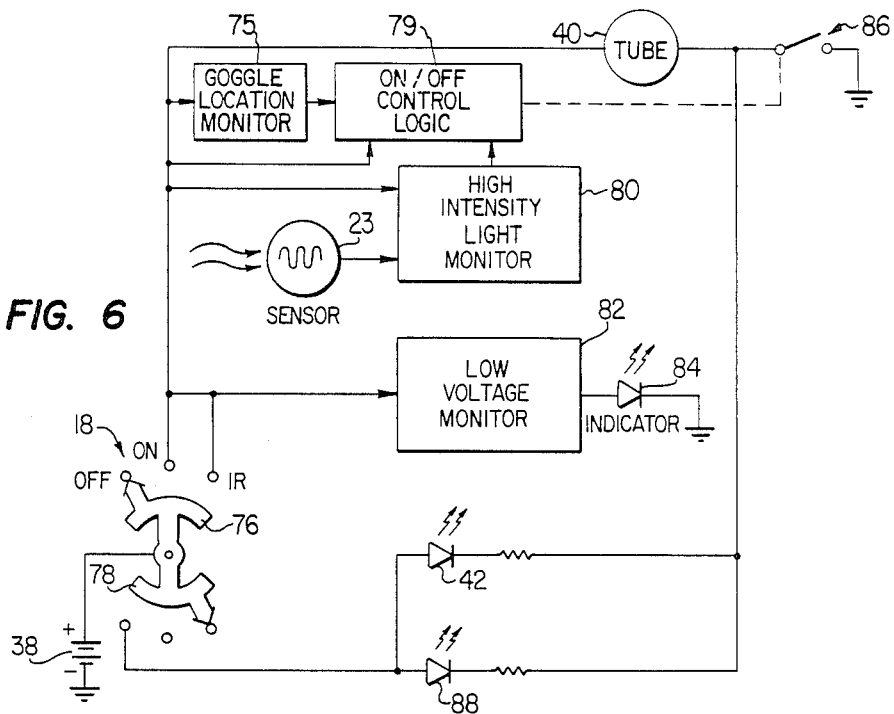
FIG. 6 is a block diagram of a goggle circuit, showing monitor functions, including a light intensity monitor and a low voltage monitor circuit.

The application of the present invention is best understood by referring to FIG. 1 of the drawing. A night vision goggle, indicated generally by 10, is detachably mountable to a headgear 12. The night vision goggle is much like a pair of binoculars, including a pair of eye piece structures 13 and 14 optically coupled to internal image amplification apparatus. The faint light reflected from an object is projected through a lens assembly 16 and is also optically coupled to the image amplification apparatus. Night vision goggles of the type described are well known in the art, a particular such goggle being disclosed in U.S. Pat. No. 4,463,252.

The night vision goggle employed with the invention includes a multiposition manual switch 18 which switchably connects a battery 20 to an image intensifier tube (not shown) or other essential goggle circuitry. The manual switch 18 includes an Off position for disconnecting the battery 20 from all circuitry, and an On position for connecting the battery 20 to appropriate circuitry for allowing the wearer to observe objects in the darkness. The manual switch 18 also includes an IR position for activating a small infrared lamp or light emitting diode 22 to provide a very small amount of light for viewing objects close up, such as reading a map. A light intensity sensor 23 is mounted in the frontal frame of the goggle 10 to monitor the intensity of light entering the goggle and processed by the image intensifier tube.

A male engaging member 24 is fixed to the goggle frame 26 and is shaped for engagement within a mating receptacle 28 on a frame 30 molded as part of the headgear 12. The male member 24 includes a latching mechanism 32, cooperating with a catch (not shown) in the receptacle 28, thereby removably attaching the goggle 10 to the headgear 12.

In accordance with the invention, there is provided means for sensing the detachment of the goggle 10 from the headgear 12. The detachment sensing means comprises a ferromagnetic material, such as a magnet 34, and is shown mounted in the top sidewall of the receptacle 28. For clarity, a magnetic reed switch 36 is shown molded within the male member 24 in such a location that it is proximate the magnet 34 when the male member 24 is fully engaged and latched within the receptacle 28. As will be described more fully below, the magnetic reed switch 36 is operative to trigger other circuitry to disconnect the battery 20 when the night vision goggle 10 is detached from the headgear 12. The magnet 34 may be fixed to the receptacle 28 by cementing, or by other mechanical hardware. Similarly, the magnetic reed switch 36 is embedded within the male member 24, or also fixed such as by cementing or by the use of other hardware.

The relative positions of the magnet 34 and the reed switch 36 are shown in FIG. 2. The magnet is fastened with an adhesive within the bottom of the receptacle 28. The reed switch 36 is fixed by adhesive within a hole in the goggle frame 26. The reed switch 36 is located in the frame 26 directly below the magnet 34. Both proximity sensing elements 34 and 36 are typically embedded, and thus are not exposed to the environment.

The spacing between the magnet 34 and the reed switch 36 depends on the strength of the magnet. The goggle frame 26 and headgear receptacle 28 are constructed so that the spacing between these proximity sensing elements is about 0.16 inch. The goggle frame 26 and receptacle 28 are formed of a plastic material so that the magnetic field in the vicinity of the reed switch 36 is not severely attenuated. Many types of reed switches and magnets are commercially available which can serve the proximity sensing function described herein.

With reference now to FIG. 3, there is shown the battery control circuit, together with the various switches for controlling the path of battery current to appropriate goggle circuits. A battery 8 is the source of power for the photomultiplier or image intensifier tube 40. Typically, two 1.5 volt batteries are connected in series to provide a 3 volt source. Provisions are also made for supplying power to the diode 22 which then emits infrared light. With regard to the circuit connections, the positive terminal of battery 38 is connected to a pole 44, termed "Det", of a single pole double throw magnetically operated reed switch 36. Switch contact 44 is operative to remove power from the tube 40 when the goggle 10 is detached from the headgear 12. Contact 46 of magnetic switch 36, termed "Att", is connected to circuit ground through a 1000 ohm resistor 48. The pole 50 of magnetic reed switch 36 is connected to a latching relay coil 52 through a 100 microfarad capacitor 54. The value of capacitor 54 is selected, together with the resistance of relay coil 52, to yield a 2-5 ms current pulse through the coil.

The positive terminal of battery 38 is also connected to a pole 56 of a single pole double throw latching relay K1. Contact 58, termed "Rst", is associated with K1 reset coil 52, and is connected to contact 60, "Off", of the three position manually-operated switch 18. Contact 62, termed "Set", of latching relay K1 is associated with K1 coil 64, and is connected thereto through a 100 microfarad capacitor 66. The other terminal of latching relay coil 64 is connected to circuit ground. Contact 62 of K1 latching relay is also connected to pole 68 of the manually-operated switch 18. As noted in the diagram, pole 68 of the manually-operated switch 18 is rotatably switchable to contact 60 "Off", contact 70 "On" or contact 72 "IR". The On contact 70 of the manually-operated switch 18 is connected to the plate of the image intensifier tube 40. The cathode of the tube 40 is connected to circuit ground. The On contact 70 is also connected to the cathode of a diode 74. The IR contact 72 is connected in parallel to the anode of the diodes 22 and 74. The cathode of infrared emitting diode 22 is connected to circuit ground.

With regard to the operational aspects of the components comprising the battery control circuit, it is to be noted that when the goggle 10 is engagably attached to the receptacle 28 of the headgear 12, pole 50 of the magnetic reed switch 36 is connected to the Att contact 46. This switched arrangement is a result of the magnetic coupling of the magnet 34 and the reed switch 36. When the goggle 10 is detached from the headgear 12, the magnetic coupling is removed and pole 50 is switched to the Det contact 44. The switchable connection of pole 56 of latching relay K1 is governed by the energizing of K1 coil 52 or coil 64. When approximately 3 volts is impressed across K1 latching relay coil 52, pole 56 is switched to Rst contact 58. Conversely, when 3 volts is impressed across K1 relay coil 64, pole 56 is switched to Set contact 62.

With regard to the functional details of the battery control circuit, it is to be noted that FIG. 3 illustrates the position of the various switches and relays when the night vision goggle 10 is engageably attached to the headgear 12. Also, the manually-operated switch 18 has been set by the operator to the On position so as to view objects in the darkness. In accordance with this mode of operation, the image intensifier tube 40 is supplied with power from battery 38 through latching relay pole 56 and Set contact 62, as well as through the manually-operated switch pole 68 and On contact 70. It should also be noted that if pole 56 of the K1 relay were connected to the Rst contact 58, the switching of manually-operated switch pole 68 to the Off contact 60 would cause the charging of capacitor 66 and a corresponding current flow through K1 relay coil 64. As a result, K1 latching relay pole 56 would be switched back to the Set contact 62. When subsequently switched to the On position, battery current would again flow from the battery 38 through the K1 Set contact 62 and then to the image intensifier tube 40. Thus, irrespective of the state of the magnetic latching relay K1, a battery circuit to the tube 40 will be provided when the manually-operated switch is rotated to the On position.

In the event it is decided to deactivate the night vision goggle 10, it is only necessary to turn the manually-operated switch 18 to the Off position. The current path from the battery 38 to the image intensifier tube 40 is thereby disconnected, and no battery power is consumed by the circuit. It is noteworthy that with this arrangement of switches, the battery 38 is yet connected to the capacitor 66 and K1 latching relay coil 64. However, because capacitor 66 blocks the flow of dc current therethrough, no sustaining current flows in the control circuit.

Assuming once again the switch configuration as shown in FIG. 3, should the night vision goggle 10 become detached from the mating receptacle 28 of the headgear 12, the magnetically operated reed switch 36 will be removed from the magnetic field of the magnet 34. As a result, pole 50 of magnetic reed switch 36 will make contact with Det contact 44. The operation of the magnetic reed switch 36 allows the charging of capacitor 54 and a momentary current pulse to pass through K1 relay coil 52. Irrespective of the switched position of the manually-operated switch 18, the current pulse will cause pole 56 of latching relay K1 to switch to the Rst contact 58. K1 switch pole 56, thus connected to the battery 38, will operate into an open circuit. As a result of the detachment of the night vision goggle 10 from the headgear 12, the battery 38 is disconnected from the image intensifier tube 40. As noted above, this not only conserves battery energy, but also extinguishes the internal illumination of the phosphor screen which can be seen by others with night vision goggles.

FIG. 4 illustrates the battery control circuit with the switches and relays connected after the goggle 10, which was switched On, was detached from the headgear 12. As noted above, the battery 38 is completely isolated from the image intensifier tube 40, and the reed switch pole 50 is switched to Det contact 44. Moreover, with the switches and relays in the position noted in FIG. 4, capacitor 54 blocks dc current flow, thereby eliminating any sustaining dc current from the battery 38 to circuit ground. With the provision of the bistable latching relay K1, battery current is only required during the charging of capacitors 54 and 66 to place such relay in the respective reset and set states. Also, because relay K1 remains in a latched condition without continuous excitation of the coils 52 and 64, an energy efficient circuit is provided. This is highly important in field operated equipment where batteries may not be readily available.

Continuing with the description, if the night vision goggle 10 is engageably attached to the receptacle 28 of the headgear 12, the pole 50 of the magnetic reed switch 36 will be activated by the magnet 34 and will again connect with Att contact 46. The only ramification of this switch action is the connection of capacitor 54 to resistor 48, thereby discharging the capacitor. Latching relay K1 remains in the reset position, and battery power is yet removed from the image intensifier tube 40. This aspect is important as it eliminates the possibility of discharging the battery 38 should the goggle 10 be reengaged with the headgear 12 and stored without rotating the manually-operated switch 18 to the Off position. In order to reactivate the night vision goggle 10, the manually-operated switch 18 must be cycled to the Off position, and then again to the On position, as shown by arrow 71 in FIG. 5.

FIG. 5 illustrates the battery control circuit just before the pole 68 of the manually-operated switch 18 makes contact with the Off contact 60. When the pole 68 of the manually-operated switch 18 contacts Off contact 60, battery current flows through the Rst contact 58 of K1 latching relay, through the Off contact 60 and pole 68 of the manually-operated switch 18 to capacitor 66. The charging of capacitor 66 by the battery current allows a pulse of current to flow through K1 latching relay coil 64 switching the pole 56 thereof to the Set contact 62.

After the manually-operated switch 18 is cycled, the pole 68 thereof is connected to On contact 70, thereby providing an electrical circuit from the battery 38 to the image intensifier tube 40. Conventional night vision goggles are provided with the manually-operated On-Off switch 18. It should be appreciated, therefore, that additional manually operated switches are not required, which additional switches could be confusing or would require further knowledge of the operation thereof. In addition, the foregoing battery control circuit does not hamper, or otherwise alter the function of the On-Off switch, as heretofore known. For example, when the night vision goggle 10 is engageably attached to the headgear 12, the placement of the manually-operated switch 18 in the Off position will always remove battery power from the image intensifier tube 40. Similarly, when the manually-operated switch 18 is placed in the On position, the image intensifier tube 40 will always be powered by the battery 38. The only additional operation which must be learned by the wearer is the cycling of the manually-operated switch 18 in the Off-On sequence to render the goggle functional when reattached to the headgear 12.

A third position of the manually-operated switch 18 is generally provided, and is labeled IR. The IR switch position functions exactly like that as the On position, except, in addition to the powering of the image intensifier tube 40, infrared light is emitted from diode 22. With reference back to FIG. 3 of the drawings, when pole 68 of the manually-operated switch 18 is switched to IR contact 72, current flows from the battery 38 through infrared light emitting diode 42. In addition, current flows through diode 74, thereby supplying power to the image intensifier tube 40. The infrared diode 22 is located at the front of the goggle and directed so that it illuminates closely located objects in front of the goggle lens 16.

Another battery control circuit of the invention is shown in block diagram form in FIG. 6. Here, the On-Off switch 18 is shown as a dual section switch, having sections 76 and 78 shorted together. The positive terminal of the battery 38 is connected to the switch sections 76 and 78. Associated with each switch section 76 and 78 are Off, On and IR positions selectable by the rotation of the manual switch 18. When in the Off position, the battery 38 is disconnected from all electrical circuits of the goggle, and thus no battery current flows. The night vision goggle 10 is activated by rotating the manual switch 18 to the On position. The battery 38 is then connected to the image intensifier tube 40, a goggle location monitor 77, on/off control logic 79, a high intensity light monitor 80 and a low voltage monitor 82. The high intensity light monitor 80 is connected to the light sensor 23 mounted to the front of the goggle 10. The output of the high intensity light monitor 80 is connected to the on/off control logic 79 which controls the operation of a switch 86. The low voltage LED monitor 82 blinks a visual indicator 84 to denote a low voltage condition of the battery 38. The on/off control logic 79 controls the switch 86 which is in series with the battery 38 and the image intensifier tube 40. When closed, the switch 86 connects the tube 40 to ground, thereby allowing battery power to activate the tube and provide a display of an object to the observer.

When switch 18 is rotated to the IR position, battery power is still provided to the tube 40 and also to the monitors 77, 80 and 82, and to the control logic circuit 79. This is evident as the On and IR positions of switch section 76 are shorted together. In addition, when manual switch 18 is in the IR position, switch section 78 supplies power to the IR light emitting diode 42 and to a light emitting diode 88 which emits light in the visible spectrum. The series switch 86 noted above is also in series with the battery 38 and the diodes 42 and 88. The IR diode 42 emits light in the non-visible range, and thus provides no visual indication to the naked eye of the observer as to whether it is on or off. Accordingly, the light emitting diode 88 is shunted across the IR diode 42 to provide a visual indication to the naked eye as to whether the IR diode is on or off. Diode 88 is preferably located within the goggle 10, in the line of sight vision of the observer. Most preferably, the ray bundle of light emitted by diode 88 is integrated into the image ray bundle produced by the image intensifier tube 40, in the manner described in the above-identified application entitled "Turning Mirror for Integrating Image and Light Indicator Ray Bundles".

The high intensity light monitor 80 utilizes light sensor 23 to sense the ambient light to which the goggle 10 is exposed. The high intensity monitor 80 senses when the ambient light exceeds a predefined threshold for a predetermined period of time. The control logic 79 is then activated, whereupon the switch 86 is opened, and power is removed from the tube 40 and the diodes 42 and 88. It is to be noted that the high intensity light monitor 80 still receives battery power, but such circuits are of the low power type which consume a negligible amount of battery current, as compared to that of the tube 40 and diodes 42 and 88. As will be discussed in more detail below, the on/off control logic includes a latching circuit which, when the switch 86 is opened, will not automatically close when the goggle 10 is removed from the high intensity light situation.

Figure 7:
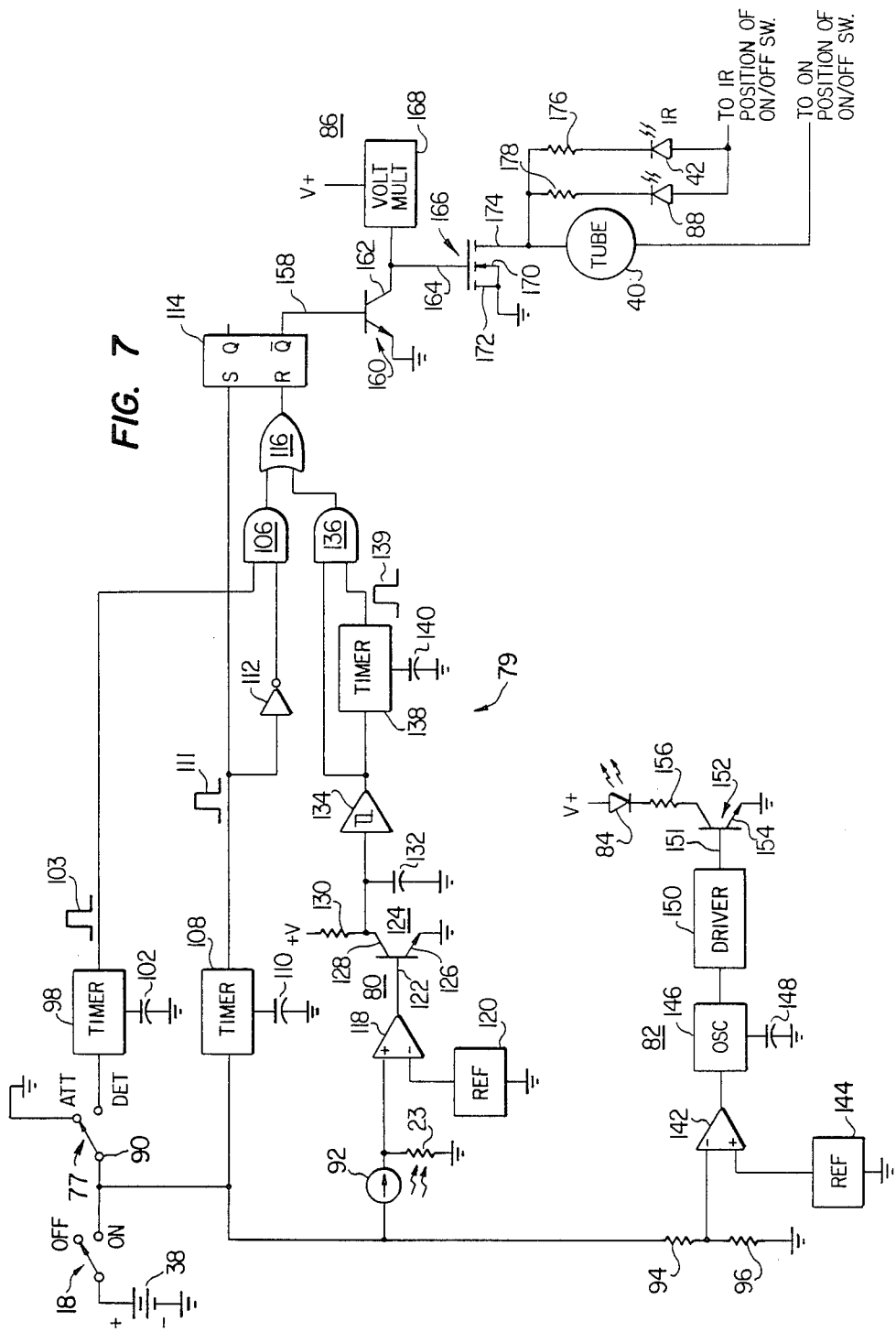
FIG. 7 is a detailed electrical schematic drawing of the light intensity monitor and the low voltage monitor.

With reference now to FIG. 7, there is illustrated the details of the electrical circuits of the goggle battery control. The positive terminal of the battery 38 is connected through the manual on-off switch 18 to a pole 90 of a magnetic switch, comprising the goggle location monitor 75. The battery 38 is connected to the manual switch 18, and therethrough to a constant current source 92 associated with the high intensity light monitor 80. Battery power is also connected through the manual switch 18 to a voltage divider comprising resistors 94 and 96 associated with the low voltage monitor 82. A monostable timer 98 is connected to a pole 90 of the magnetic switch. The timer 98 is connected to a capacitor 102, the value of which determines the output pulse width 103 of the timer 98. An output 104 of the timer 98 is connected to an AND gate 106.

The On contact of manual switch 18 is connected to a timer 108 which is constructed similar to that of timer 98, including a timing capacitor 110. The output of timer 108 is a positive pulse 111 which is coupled to the input of an inverter 112, as well as to the Set input of a bistable flip-flop 114. The output of AND gate 106 is connected to one input of a two-input OR gate 116. The output of the OR gate 116 is connected to the Reset input of the flip-flop 114.

With regard to the high intensity light monitor 80, the light sensor 23 comprises a resistor whose resistance is inversely proportional to the amount of light striking the element. The junction of the series-connected constant current source 92 and light sensor 23 is connected to the non-inverting input terminal of a comparator 118. The inverting input of the comparator 118 is connected to a stable reference voltage 120. The output of the comparator is connected to the base 122 of an NPN transistor 124. The emitter 126 of the transistor 124 is grounded, while the collector 128 is connected through a resistor 130 to the battery 38. The battery is denoted in the various circuits as the symbol V+. The collector 128 of transistor 124 is connected in parallel to a capacitor 132 and to the input of a Schmitt trigger type of buffer 134. The output of buffer 134 is connected in parallel to one input of a two-input AND gate 136 and to the input of a timer 138. The timer 138 output is a positive pluse 139 which is coupled to the other input of the AND gate 136. The timer 138 is a monostable which produces a pulse width determined by the value of the timing capacitor 140. The output of AND gate 136 is connected to the other input of the OR gate 116.

With regard to the low voltage monitor 82, the junction of the resistor divider formed by resistors 94 and 96 is connected to the inverting input of a comparator 142. The non-inverting input of the comparator 142 is connected to a stable voltage reference 144. The output of comparator 142 is connected to a low frequency oscillator 146 having a frequency determined by a capacitor 148. The output of the oscillator 146 is connected to driver 150 which produces an output of about two hertz. The output of the driver 150 is connected to the base 151 of an NPN transistor 152. The emitter 154 of the transistor 152 is grounded, while the collector is connected through a load resistor 156 to the cathode of the low voltage indicator light emitting diode 84. The anode of the LED indicator 84 is connected to the supply voltage V+.

The series switch 86 is connected to the $\overline{Q}$ output of the bistable flip-flop 114 and is effective to selectively switch a ground connection to both the image intensifier tube 40 and the cathodes of light emitting diodes 42 and 88. The advantage of this approach is that when the switch 86 is closed, a current path is provided through the tube 40 and diodes 42 and 88. On the other hand, when the switch 86 is open, the current path through these elements is interrupted and power is thus effectively removed from these circuit elements.

The $\overline{Q}$ output of the flip-flop 114 is connected to the base 158 of a grounded emitter driver transistor 160. The collector 162 of driver transistor 160 is connected in parallel to the gate 164 of a field effect transistor FET 166, and to the output of a voltage multiplier 168. Transistor 166 is an N-channel enhancement type of transistor. The source 170 of the FET 166 is grounded. The drain 174 of the FET 166 is connected in parallel to the image intensifier tube 40 and to respective load resistors 176 and 178 of the parallel-connected light emitting diodes 42 and 88.

With regard to the integrated circuit fabrication of the circuit of FIG. 7, it should be understood that the timers 98, 108 and 138 are all identically fabricated one-shot monostables, with discrete capacitors having values establishing timer output pulses of varying durations. With regard to the operation of the circuit, it should be initially understood that timer 98 is responsive to the detachment of the goggle 10 of the head gear 12 to cause the bistable flip-flop 114 to become reset, and thereby force the switch 86 to become opened. This removes power from the image intensifier tube 40, and also removes power from the diodes 42 and 88. The high intensity light monitor 80 is responsive to an ambient light condition which is brighter than a predefined threshold for a time greater than a predetermined period. When this condition exists, the switch 86 is opened to remove power from the noted circuits. Timer 108 is responsive to the connection thereof to the battery voltage, indicating the actuation of the manual switch 18 from the Off position to the On position. This sets the bistable flip-flop 114 to an initial state and closes the switch 86 to apply battery power to the electrical circuits. As with timer 98, the high intensity light monitor timer 138 produces an output pulse 139 which resets the flip-flop 114 and opens the series switch 86.

In more detail, when the goggle 10 is activated by the operation of the manual switch 18 from the Off position to the On position, timer 108 places flip-flop 114 into an initial desired state. Timer 108, as well as the other similarly constructed timers 98 and 138, is of the type which provides an output positive pulse 111 in response to a positive going input voltage transition. Thus, when the timers are not provided with such an input, the output states thereof are at a logic low level.

In order to establish the initial state of the flip-flop 114, the rotational movement of the manual switch 18 from the Off position to the On position, timer 108 will provide an output positive pulse 111 which is applied to the Set input of flip-flop 114. When flip-flop 114 is set, the $\overline{Q}$ output thereof is driven to a logic low which closes the switch 86. More particularly, when flip-flop 114 is in its set state, the $\overline{Q}$ output logic low places driver transistor 160 in a non-conductive state. The voltage multiplier 168 thus applies its full output voltage to the gate 164 of FET 166 and drives it into a conductive state. When FET 166 is conducting, a current path is provided through such transistor to thereby allow operation of the image intensifier tube 40 and the diodes 42 and 88. Accordingly, when the manual switch 18 is cycled or switched from the Off position to the On position, the flip-flop 114 is set, the FET 166 conducts and renders the goggle circuits operational.

In accordance with an important feature of the invention, the switch 86 must have a low impedance when closed or otherwise rendered conductive. While mechanical switches have an inherent low contact resistance, such devices are expensive when manufactured according to military standards. Bipolar transistors may also be driven into a very low impedance state, however the drive current thereof becomes significant, and thereby shortens the life of the battery 38. It can be appreciated that the battery life of the goggle 10 is critically important, in that the goggles are normally field operated where replacement batteries may be difficult to obtain. Much like bipolar transistors, FET transistors are easily obtainable at economical prices. While FET transistors can be driven with currents on the order of several magnitudes less than that of bipolar transistors, the series channel resistance of FET devices can be substantial, unless special precautions are taken. The series resistance presented by the switch 86 to the image intensifier tube 40 is critically important, in that the impedance of a conventional image intensifier tube 40 is only about 50 ohms. Thus, any switch resistance placed in series with the tube 40 only reduces the voltage across the tube and thereby reduces the sensitivity of the tube 40, especially at reduced battery voltage conditions.

The voltage multiplier 168 is provided for driving the FET transistor 166 with a voltage higher than that of the battery 38 so as to reduce the series resistance of the transistor 166. When driven with a voltage which far exceeds the inherent threshold voltage of the FET 166, such transistor exhibits a very low series impedance to its load. With a battery voltage in the range of 2-3 volts, the voltage multiplier 168 produces an output voltage in the order of 6-9 volts. With this increased drive voltage, conventionally available FET transistors can be driven into conductive states with series impedances on the order of 0.3 ohm or less. With the use of an FET transistor as the series switch element, a very low series impedance is provided to the tube 40, and very little battery current is required as the FET transistor requires insignificant input drive current to its gate terminal 164. The details of the voltage multiplier 168 will be described in more detail below.

During normal use of the goggle 10 in low light conditions, the operation of the image intensifier tube 40 can be interrupted on the occurrence of two events. First, if the goggle becomes detached from the head gear 12, the magnetic reed switch 77 is opened, power is removed from the tube 40 and it is thus rendered inoperative. Secondly, the tube 40 is also rendered inactive if the goggle 10 is subjected to high light conditions in which the operation of the goggle 10 is not necessary. These two situations are controlled by the timer 98 which responds to the detached goggle situation, and the high intensity light monitor 80 which responds to particular light levels.

In the event the goggle 10 becomes detached from the head gear 12, as fully described above, magnetic switch 77 (switch 36 in FIG. 2) operates, and the pole 90 thereof is connected to the DET contact. The positive battery transition on the input of timer 98 causes an output pulse 103 to be generated. The positive pulse 103 is coupled through AND gate 106 and OR gate 116 to the Reset input of flip-flop 114. The other inputs of gates 106 and 116 are in respective logic high and low states to thereby enable the coupling of the pulse 103 therethrough. In the Reset state, the $\bar{Q}$ output of flip-flop 114 is driven to a logic high, thereby driving NPN transistor 160 into a conductive state. The voltage on the collector 162 of the transistor 160 is thus driven to a logic low level, rendering FET 166 non-conductive. This corresponds to a condition in which switch 86 is opened, and power is removed from the image intensifier tube 40 and the other switched circuits. Accordingly, when the goggle 10 is detached from the head gear 12, power is automatically removed from the switched circuits.

Importantly, once the power is removed from the switched circuits by the flip-flop 114, the power is not thereafter restored by reattachment of the goggle 10 to the head gear 12. It can be seen that the flip-flop 114 can only be set by generating the set pulse 111 by cycling the manual switch 18 from the Off to the On position. Thus, the user can restore operation of the goggle by the recycling of the manual switch 18, irrespective of whether or not the goggle 10 has been reattached to the head gear 12. This is advantageous as the goggle 10 can be used by other persons, whether or not they are equipped with head gear equipment 12.

The high intensity light monitor 80 is also capable of terminating the normal operation of the goggle 10 by removing the power to the image intensifier tube 40, under certain conditions. The use of night vision equipment is highly advantageous when light levels are about $10^{-4}$ foot lamberts, or less. With an ambient light intensity of this level, objects cannot be discerned by the naked eye, and thus the photomultiplication or amplification by night vision equipment provides the users with a large advantage over those persons who are not so equipped.

The light intensity threshold of the monitor 80 is determined by the current level of the constant current source 92, and the resistance range of the light sensor 23. In the preferred form of the invention, these elements are selected such that at a light intensity level of about 1-4 foot lamberts, the voltage at the non-inverting input of comparator 118 is substantially equal to the reference voltage 120. The reference voltage 120 is set to about 0.6 volt. With normal night or low light intensities, the resistance of the light sensor 23 is large. The voltage developed across the large resistance of the light sensor 23 by the constant current source 92 is thus much larger than the 0.6 volt reference. Accordingly, the voltage on the non-inverting input of the comparator 118 will be greater than that on the inverting input, thereby driving the comparator output to a logic high.

Transistor 124 is driven into a conductive state by the comparator output high level, wherein capacitor 132 is discharged. The low collector voltage of transistor 124 is coupled through the Schmitt-type buffer 134 as a logic low to the timer 138. The timer 138 is nonresponsive to this condition, as it is constructed to produce output positive pulses only on positive input transitions.

In the event that the goggle 10 is subjected to ambient light in the neighborhood of 1-4 foot lamberts, the resistance of the light sensor 23 becomes significantly reduced. As a result, the constant current through the resistance of the sensor 23 develops a voltage thereacross which is less than the 0.6 reference voltage. With the increased light intensity, the output of the comparator 118 is driven to a logic low, whereupon transistor 124 becomes non-conductive. Capacitor 132, which was previously in a discharged state, starts charging with a time constant based upon the resistance of load resistor 130 and the capacitance of capacitor 132. These values are selected such that the charging time constant of the capacitor 132 reaches the threshold of the Schmitt-type buffer 134 after about one minute.

When the voltage across capacitor 132 reaches the threshold of the buffer 134, the buffer output is driven to a logic high which triggers the timer 138. With the buffer output at a logic high, and with the timer output pulsed to a positive level, the output of AND gate 136 is also driven to a logic high. With a logic high coupled to the input of the OR gate 116, a corresponding logic high is produced at its output, thereby resetting the flip-flop 114. As noted above with regard to the timer 98, a Reset state of the flip-flop 114 causes the switch 86 to be opened to thereby remove power from the switched tube circuit 40 and the light emitting diodes 42 and 88. Power can only be reestablished to the image intensifier tube 40 by cycling the manual switch 18 from the Off to the On position.

A low voltage monitor 82 is also connected to the battery 38 for detecting when a low voltage condition exists. Comparator 142 is provided for comparing a battery voltage with the reference voltage 144. Reference voltage 144 is set to about 1.3 volts. The night vision goggle 10 is constructed to operate over a range of battery voltages, from a fully charged condition of about 3 volts, to a low voltage condition of about 2 volts. The resistance values of resistors 94 and 96 are selected such that when the battery is discharged to about 2 volts, a voltage existing at the resistor divider junction is about 1.3 volts. Thus, when the battery voltage discharges to the nominal 2 volt level, the output of the comparator is driven to a logic high level, thereby activating the oscillator 146. Capacitor 148 establishes a fundamental oscillator frequency of about two hertz. However, any frequency low enough to blink the low voltage indicator LED 84 is acceptable. The output two hertz signal from the driver 150 drives the transistor 152, thereby blinking the low voltage indicator LED 84 at a corresponding rate. The blinking LED indicator 84 will thus be noticeable to a user who has activated the goggle 10. The low voltage monitor 82 is constructed so that a low voltage indication is provided somewhat before the battery 38 becomes discharged to a condition which renders the goggle circuitry unreliable. Therefore, the goggle user has advance notice of an imminent goggle failure, and that the battery 38 should be substituted with a replacement.

Figure 8:
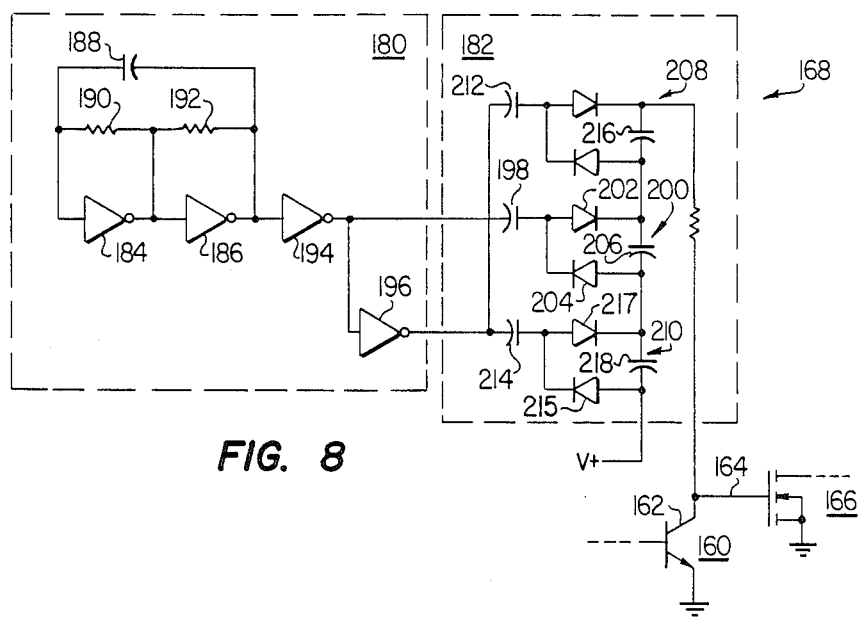
FIG. 8 is a detailed electrical schematic of the voltage multiplier circuit for driving a series battery switch.

FIG. 8 illustrates the details of the voltage multiplier 168 used for providing an increased driving level to the FET 166 of FIG. 7. The voltage multiplier 168 comprises a free running oscillator 180 coupled to a voltage tripler 182. The oscillator 180 includes an inverter 184 connected in series to another inverter 186. The output of inverter 186 is connected through a capacitor 188 back to the input of the inverter 184. Resistors 190 and 192, together with the value of the capacitor 188, determine the basic operating frequency of the oscillator 180. In the preferred form of the invention, the oscillator 180 operates at a 10 kilohertz frequency. The output of inverter 186 is coupled to the input of an inverter 194. The output of inverter 194 is connected to the input of another inverter 196, as well as to a capacitor 198. The output of inverter 194 drives a voltage multiplier section 200 comprising diodes 202 and 204, together with capacitor 206. The output of inverter 196 drives similar voltage multiplier sections 208 and 210 through respective coupling capacitors 212 and 214. Voltage multiplier sections 208 and 210 are driven out of phase with respect to section 200. Thus, during one logic state of the oscillator output, certain sections of the voltage multiplier 182 are driven, while other sections thereof are driven during the opposite oscillator output state.

Voltage multiplier section 210 operates in the following manner. When the output of the inverter 196 is at a logic low, capacitor 214 charges through diode 215 to a voltage of about one diode drop below the battery voltage. When the oscillator changes state, and the output of inverter 196 is driven to a logic high, the charge on capacitor 214 is transferred through diode 217 to capacitor 218. As a result, capacitor 210 is charged to a voltage about equal to the battery voltage. Multiplier sections 200 and 208 work in a similar manner, charging the respective capacitors 206 and 216 to voltages about equal to that of the battery 38.

Since each voltage multiplier section 200, 208 and 210 are in series, the effective voltage thereacross is about three times that of the supply voltage. However, since one end of the voltage tripler 182 is connected to the battery voltage V+, the total voltage applied to the collector 162 of transistor 160 is about four times that of the battery voltage. When drive transistor 160 is driven to a non-conductive state, as above described, the multiplied voltage of the voltage multiplier circuit 168 is applied to the gate 164 of FET transistor 166. Therefore, with the increased gate drive far above the threshold voltage of the transistor 166, a significantly reduced switch resistance is placed in series with the image intensifier tube 40.

From the foregoing, a highly efficient battery control circuit is provided. The circuit provides for magnetic coupling between the goggle and the headgear and thus is responsive to the detachment thereof. The battery control circuit further includes a bistable latching means which requires virtually no power when in either state, and which is operative to connect or disconnect the image intensifier tube from the battery. The On-Off switch conventionally provided with the night vision goggle controls the battery power supplied to the image intensifier tube when the goggle is attached to the headgear. Additional battery control circuits automatically remove power from the image intensifier tube and other circuits when the goggle is subjected to ambient light which exceeds that necessary for night vision purposes. In addition, the On-Off switch can be simply cycled to reactivate the goggle image intensifier tube. A low voltage detector provides a visual indication to the goggle user when the battery discharges below a predetermined voltage.

The preferred embodiment of the invention has been described above in detail. However, various modifications and additions or changes to the battery control circuit are undoubtedly possible by those skilled in the art without departing from the spirit and scope of the invention as claimed hereinbelow.

What is claimed is:

1. A battery control circuit for use in a battery powered goggle to protect a light sensitive element, comprising:
 a switch for controlling the application of battery power to the light sensitive element;
 means for sensing the intensity of light striking the light sensitive element and providing an output when the light intensity exceeds a predetermined amount; and
 timer means for measuring the time the high intensity light exceeds said predetermined amount and for operating said switch to remove battery power from said light sensitive element when said time exceeds a predetermined period of time.

2. The battery control circuit of claim 1 wherein said switch comprises a solid state transistor device for switching battery power to said light sensitive element.

3. The battery control circuit of claim 2 further including a drive circuit for driving said transistor with a voltage higher than the voltage of said battery to thereby provide a low impedance path through said transistor.

4. The battery control circuit of claim 3 wherein said transistor comprises a field effect transistor.

5. The battery control circuit of claim 3 further including a voltage multiplier for generating a voltage in excess of the battery voltage.

6. The battery control circuit of claim 1 further including means for preventing the automatic closure of said switch in response to light of reduced intensity after said light has exceeded said predetermined amount.

7. The battery control circuit of claim 6 further including a manual operated On/Off switch in series with said switch, and means for closing said switch after exposure of said sensing means to said reduced intensity when said manual switch is cycled from the Off position to the On position.

8. The battery control circuit of claim 7 further including a two-input bistable circuit for driving said switch, one said input being responsive to the operation of said manual switch to the On position for closing said switch, and the other input responsive to said timer means for opening said switch.

9. The battery control circuit of claim 8 further including in combination a head gear for removable attachment of the goggle therefrom, and switch means operative for removing the battery power to said light sensitive element when the goggle is detached from the head gear, and wherein said bistable circuit includes a third input responsive to said switch means for opening said switch.

10. The battery control circuit of claim 1 further including a visual low voltage indicator, and a low voltage detector for driving said indicator to provide a visual indication when the battery voltage discharges below a predetermined voltage.

11. The battery control circuit of claim 10 further including means for blinking the indicator when driven by said detector.

12. A battery control circuit for use in a battery powered goggle to control the application of power to an image intensifier tube, comprising:
a manual On-Off switch connected in series between the tube and the battery;
a transistor switch in series with the battery and the tube;
a voltage multiplier for generating a voltage in excess of the battery voltage;
a driver for driving said transistor switch with an increased output voltage of said multiplier;
a light intensity detector for detecting the intensity of light incident to the tube and providing a first output when the light exceeds a predetermined level;
a timer for providing a second output when the first output of said light intensity detector is present for a predetermined period of time; and
a bistable circuit having two inputs, and a third output connected to said driver, one input thereof being connected to said timer so that said driver opens said switch when said timer provides an output, the other input thereof responsive to the cycling of said manual switch from the Off position to the On position for closing said switch.

13. The battery control circuit of claim 12 wherein said switch comprises a single FET device.

14. The battery control circuit of claim 12 wherein said voltage multiplier comprises a voltage tripler.

15. The battery control circuit of claim 12 further including pulse forming means connected to the inputs of said bistable circuit for pulsing said bistable circuit.

16. The battery control circuit of claim 12 further including in combination a head gear for removable attachment of the goggle therefrom, and switch means operative for removing the battery power to said light sensitive element when the goggle is detached from the head gear, and wherein said bistable circuit includes a third input responsive to said switch means for opening said switch.

17. A method of controlling the operation of an image intensifier tube in battery powered night vision goggle equipment, comprising the steps of:
applying power to the tube manually when desired by the user of the goggle;
sensing when the light intensity incident to the tube exceeds a predetermined threshold for a predetermined time; and
automatically removing power from the tube when the sensed light intensity exceeds said threshold for said time.

18. The method of claim 17 for controlling the operation of the image intensifier tube in the goggle removably attachable to a headgear, further including the steps of automatically removing power from the tube when the goggle is removed from the headgear.

19. The method of claim 17 further including the step of maintaining power removed from the tube until reapplication thereof manually.

20. The method of claim 18 further including the step of maintaining power removed from the tube until reapplication thereof manually.

21. The method of claim 17 further including the step of removing battery power from an element emitting light in the nonvisible spectrum when the battery power is automatically removed from said tube.

22. The method of claim 17 further including the step of maintaining the application of power to control circuits when the power is automatically removed from said tube.

* * * * *